Figure 3:
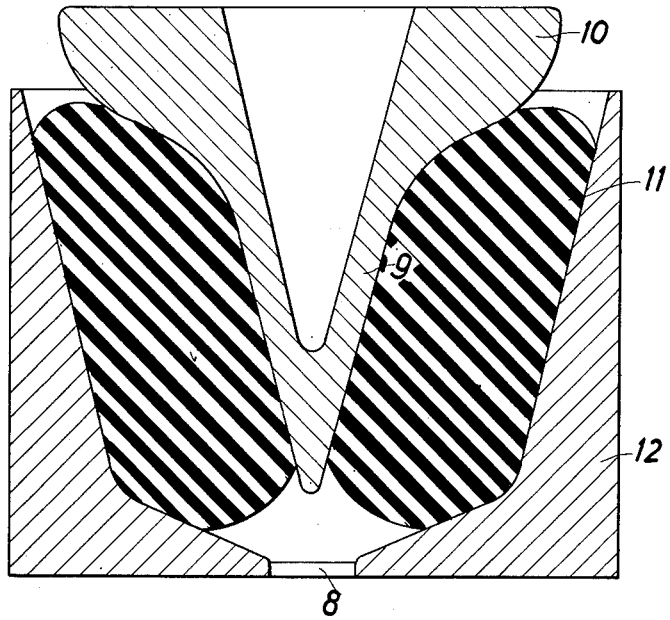

April 17, 1962     H. W. PIATSCHECK     3,030,099
RESILIENT SUSPENSION FOR AXLE BEARINGS AND THE LIKE
Filed May 22, 1959     6 Sheets-Sheet 1
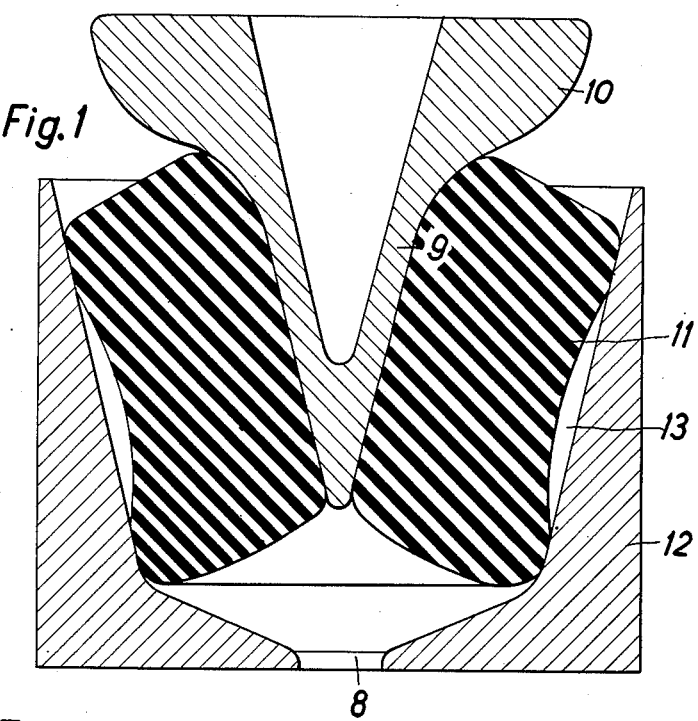
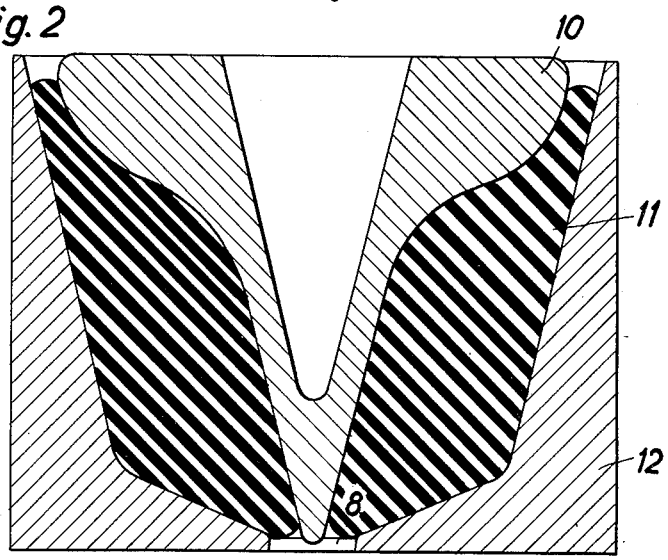
Inventor:
HELMUT W. PIATSCHECK
BY Eugene S. Lovette
ATTORNEY April 17, 1962 H. W. PIATSCHECK 3,030,099
RESILIENT SUSPENSION FOR AXLE BEARINGS AND THE LIKE
Filed May 22, 1959 6 Sheets-Sheet 2

Inventor:
HELMUT W. PIATSCHECK
BY Eugene S. Lovette
ATTORNEY

April 17, 1962 H. W. PIATSCHECK 3,030,099
RESILIENT SUSPENSION FOR AXLE BEARINGS AND THE LIKE
Filed May 22, 1959 6 Sheets-Sheet 4
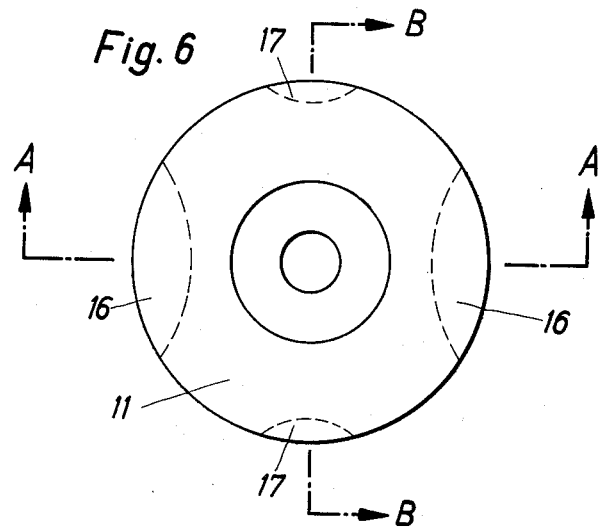
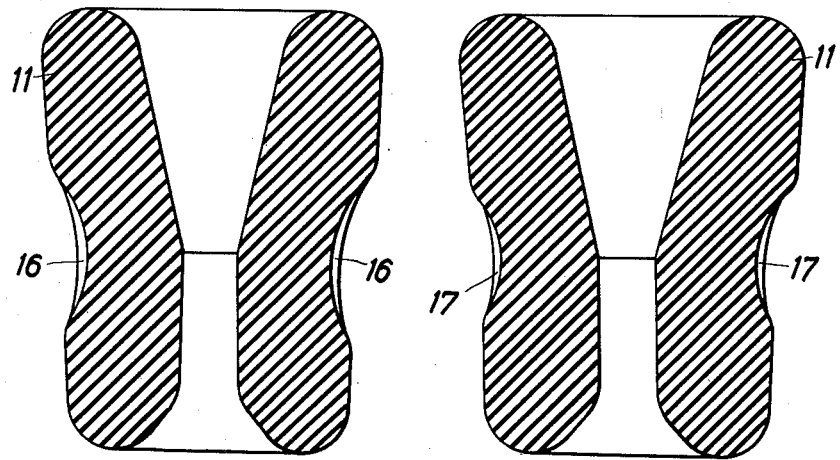
Inventor:
HELMUT W. PIATSCHECK
BY Eugene S. Lovette
ATTORNEY April 17, 1962 H. W. PIATSCHECK 3,030,099
RESILIENT SUSPENSION FOR AXLE BEARINGS AND THE LIKE
Filed May 22, 1959 6 Sheets-Sheet 6
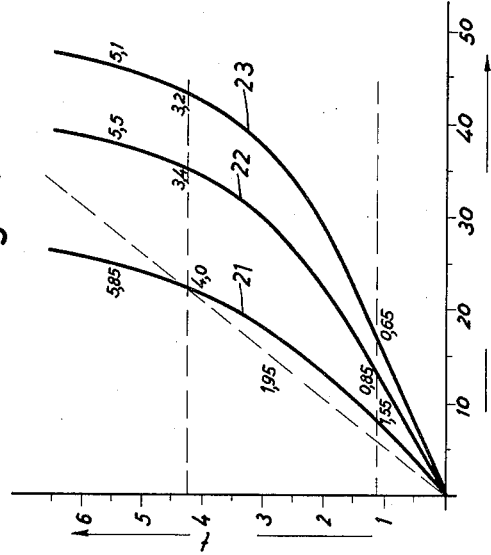
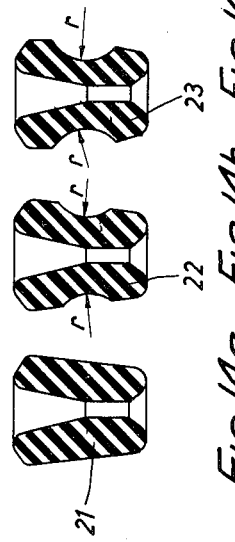
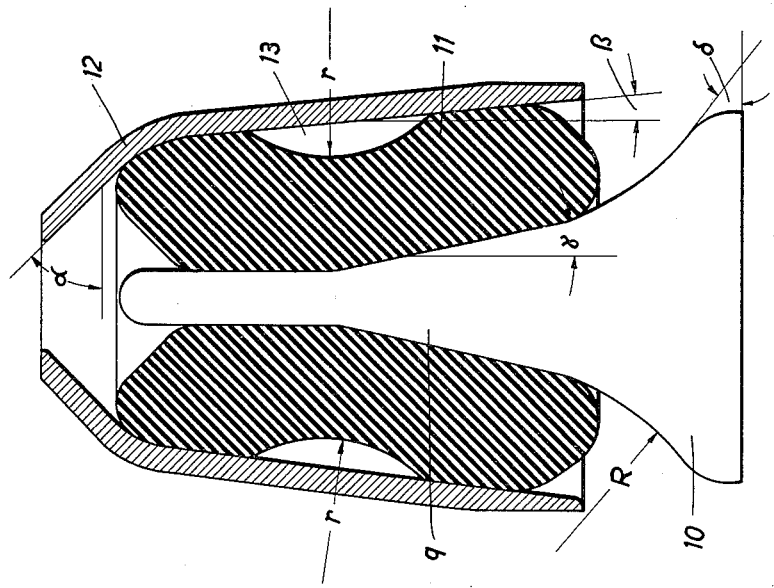
Inventor:
HELMUT W. PIATSCHECK
BY Eugene L. Lovette
ATTORNEY United States Patent Office 3,030,099
Patented Apr. 17, 1962

3,030,099
RESILIENT SUSPENSION FOR AXLE BEARINGS
AND THE LIKE
Helmut Wolfram Piatscheck, Gerhart-Hauptmann-Weg 3,
Helmstedt, Germany
Filed May 22, 1959, Ser. No. 815,061
Claims priority, application Germany May 27, 1958
9 Claims. (Cl. 267—3)

This invention concerns a resilient suspension for axle bearings and the like.

Resilient suspensions between relatively movable parts using rubber rollers or rubber rings are known, the rubber components being arranged to roll over steel surfaces.

These resilient suspensions have the disadvantage that they require a path to roll over, making the space required on the axle bearing greater and the volume of rubber to be used smaller.

Supporting bearings are also known in which a casing having a truncated inner wall surface and a base is provided with a somewhat tapering mandrel displaceable therein, an annular rubber member being arranged between the mandrel and the casing. These supporting bearings have a steeply inclined spring characteristic curve which is known to be unfavourable to axle bearings.

It is an object of the invention to provide a resilient suspension for axle bearings, in which the first part of the spring characteristic rises gently, and the spring rate becomes progressive only in the second part.

According to the present invention, a resilient suspension for axle bearings or the like, comprises a housing formed with a truncated conical inner wall surface and a base, and a generally conical mandrel displaceable in said housing, an annular rubber member being arranged between the mandrel and the housing, characterised in that the base of the housing, which is inclined towards the centre thereof, is joined to the inner surface of said housing by means of a smoothly curved, uninterrupted bend, and that the mandrel has an annular enlargement engaging the rubber member, and constituting a continuation of the generally conical region of said mandrel, said mandrel enlargement being adapted to stress said rubber member under pressure, said rubber member being in the shape of a hollow truncated cone, the inner tapering surface of which, when the axle bearing is unloaded, is in contact with the outer surface of the mandrel, and the outer conical surface of which is in contact with the inner wall of the housing and extends in the unloaded condition only as far as the start of the base of said housing.

The rubber member may be so constructed that its outer surface is in contact only by its marginal portions with the inner surface of the suspension housing, with the formation of an annular cavity. The air in this cavity can thus be compressed during the suspension movements and, since it cannot escape, it contributes to the control of the resilient forces of the suspension.

If a more gentle suspension characteristic is desired, this may be obtained by forming substantially horizontal bores in the housing of the resilient suspension, which bores extablish a communication between atmosphere, the cavity between the housing and the annular rubber member. When the suspension is loaded, the air compressed in the cavity flows out through the bores without offering any resistance in its compressed condition to the snug fitting of the rubber member against the inner surface of the housing. As soon as the load of the resilient suspension is decreased, atmospheric air can flow in to the cavity again. Manually adjustable shut-off or throttle devices by which the movement of the compressed air can be regulated, may be fitted in the bores of the housing for regulating the flow in and out of compressed air.

If the depth of the cavity or its radius is suitably selected, the spring rate can be changed in the upper load range. If the conicity of the housing of the resilient suspension is changed, the resilience of the suspension can also be changed accordingly thereby. It is therefore possible, by suitably adjusting the conicity of the housing and the depth or radius of the cavity to obtain any desired spring characteristic, the depth of the cavity being always suitably selected for the lower load range and the conicity of the housing for the upper load range.

The associated spring deflection is determined by suitable selection, on the one hand, of the taper angle of the resilient housing, on the other hand, by suitable selection of the cone angle of the mandrel and of the angle which the end of the mandrel forms with a line perpendicular to the axis of the mandrel, and the radius of the annular enlargement of the mandrel. It is possible, by suitably selecting the said dimensions, to obtain any spring characteristic or any spring deflection.

When rail vehicles are in service it is desired to keep the wear on the flanges or the wear of the tyres as low as possible. The invention makes it possible to achieve an improvement in this direction. The resilient suspension of the axle bearing must be as hard as possible in the direction of travel to avoid rocking of the vehicles while it should be softer in the direction of the axle loading. In order to achieve this, according to a further feature of the invention, the cavity, which is formed by the rubber ring with the inner surface of the housing, is divided into separate cavities of different sizes in the direction of the axle loading and in the direction of travel. The cavities located in the direction of axle loading are preferably larger than the cavities located in the direction of travel.

In order to achieve the same results, however, the cross-section of the rubber ring can be made elliptical in the general plane of the cavity, the minor axis of the ellipse lying in the direction of axle loading and the major axis of the ellipse in the direction of travel.

However, the cavity may alternatively be constructed as an annular groove round the rubber ring and smaller additional cavities simply provided in the direction of axle loading to increase the resilience in that direction. In any case, a hard spring rate in the direction of travel and a softer resilience in the axle loading direction is achieved, thus effectively reducing the wear on the flanges.

Figure 4:
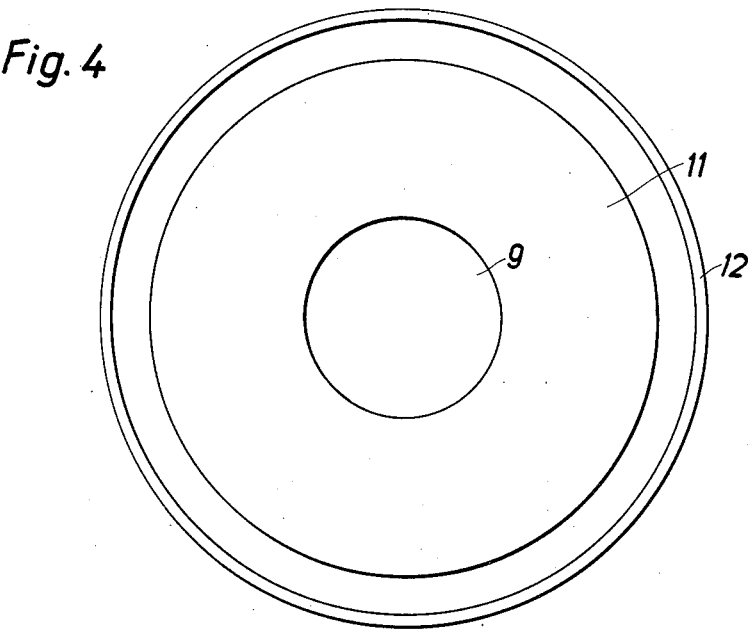
Figure 5:
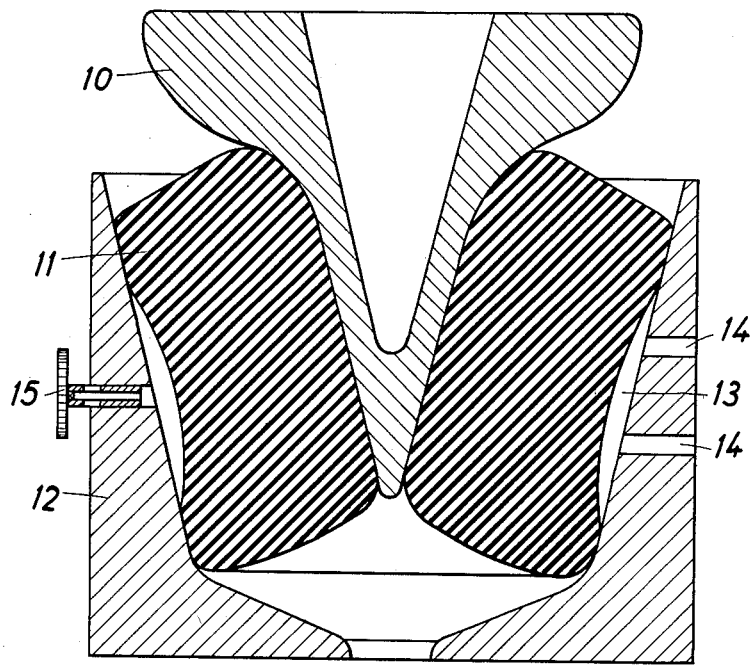
Figure 9:
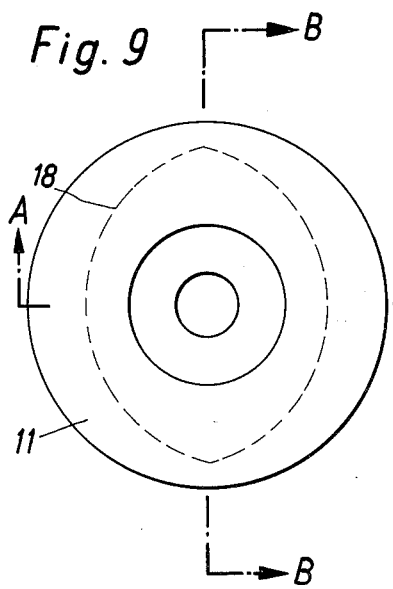
Figure 10:
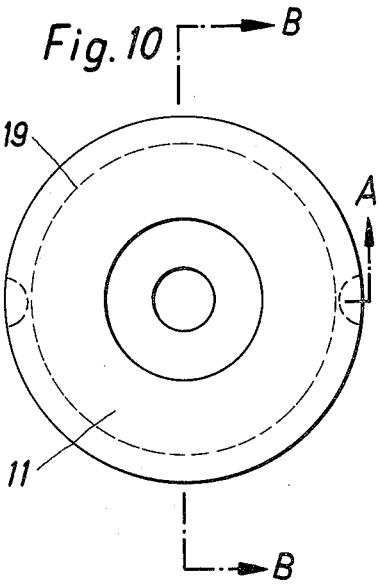
Figure 11:
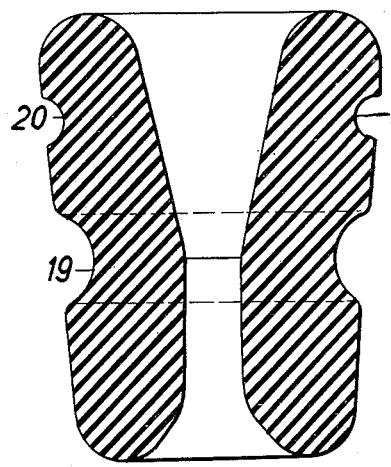
Figure 12:
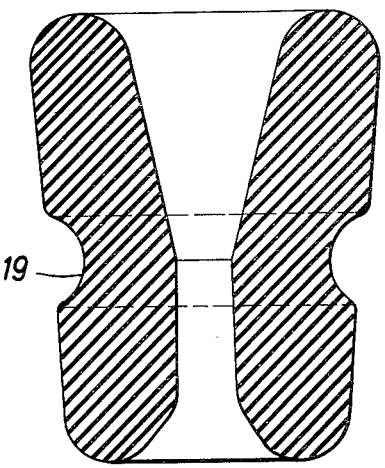

The invention will be described further, by way of example, with reference to the accompanying drawings, in which:

FIGS. 1 to 3 are axial sections through the resilient suspension of the invention, in various positions of the relatively movable parts, FIG. 4 is a top plan view through the axle bearing, FIG. 5 is a section similar to those of FIGS. 1 to 3, and showing the use of bores or throttle devices in the suspension, FIG. 6 is a top plan view of another embodiment of the rubber member, FIGS. 7 and 8 are axial sections of the embodiment of the rubber member shown in FIG. 6, FIG. 9 is a top plan view through a rubber member with a cavity which is elliptical in cross-section, FIG. 10 is a top plan view of a rubber member of an embodiment of the invention having a cavity in the form of an annular groove, and additional cavities in the axial direction, FIGS. 11 and 12 are cross-sections of the rubber member shown in FIG. 10;

FIG. 13 is a section similar to that of FIG. 1 of another embodiment of the invention and illustrating the factors controlling the spring characteristic of the suspension, FIG. 14 is a graphical illustration showing a number of characteristic curves for different suspensions, and FIGS. 14a to 14c are cross-sections through respective rubber elements, the characteristics of which are shown in curves 21, 22 and 23, respectively, of FIG. 14.

A pointed, tapering inner member or mandrel 9 is provided with an upper enlargement 10 and is surrounded at its lower portion by a body in the form of a ring 11 of resilient material. The cross-section of the ring 11, which may conveniently be of rubber, is generally rectangular. The outer surface of the ring 11 is in contact with the inner surface of a pot-shaped or interiorly tapering suspension housing 12, an air gap or cavity 13 remaining between the ring 11 and the conical inner surface of the housing.

When a load is exerted on the resilient suspension, the resulting inward movement of the mandrel 9 into the housing 12 is first accompanied by thrust stressing of the rubber member 11. As the load continues to increase, the lower surface of the rubber member 11 comes into contact with the base of the housing, as is apparent from FIG. 3. At first sufficient space is left between the base of the housing 12 and the ring to enable the ring to be more or less deflected when loaded. This results in a progressive spring characteristic because the thrust stressing changes gradually into pressure stressing and the rubber member is prevented on the conclusion of the loading operation from further deflection or deformation (see FIG. 2).

In the centre of the base of the housing 12 an opening 8 may be provided.

The resilient characteristic may take any desired course by changing the incline of the base of the housing 12.

In order to be able to influence the spring constant in the travelling and in the axle direction, the rubber member 11 or the parts 9, 12 of the axle bearing may be constructed with a round, oval or the like cross-section.

When the spring is loaded by the pressing of the mandrel 9 into the housing 12, after thrust stressing of the rubber member 11 has taken place the side of the rubber member 11 presses, as the load increases, on the inner surface of the housing 12, the air in the cavity 13 being compressed and in turn acting as a resilient suspension.

This hollow air space can be used for regulating the resilient suspension by forming bores 14 (FIG. 5), for example, of a given diameter in the wall of the housing 12 through which the air can flow out of the cavity at an adjustable speed. This can result in damping of the spring suspension.

In addition, it is possible as shown on the left of FIG. 5, to provide the bores with a throttle screw 15 in order to be able to manually regulate the air pressure in the cavity. By this means the degree of softness of the resilient suspension may be changed or an additional damping of the spring achieved.

The resilient axle bearing suspension proposed by the invention is preferably arranged with its axis perpendicular to the vehicle. This results in a resilient suspension which is effective both in the direction of travel and in the axle direction, in cross-sectional planes of the rubber member which are perpendicular to one another.

In FIGS. 6 to 8 the section A—A is in the axle direction of the vehicle, whereas the section B—B is in the direction of travel. In order to achieve resilience varying in the axle direction and in the direction of travel, the air gap in the rubber member 13 is sub-divided. According to FIGS. 6 to 8, two recesses 16 each of the same size are provided which are cut on the line A—A and become effective when the vehicle is resiliently suspended in the axle direction. In a direction perpendicular thereto, two recesses 17 are provided which are cut on the line B—B and lie one behind the other in the direction of travel. Because the recesses 16 which are in series in the axle direction, are larger than the recesses 17 arranged in the direction of travel, a suspension is obtained of greater resilience in the axle direction than in the direction of travel. This is an advantage particularly for reducing the wear and tear on the flanges of rail vehicles. A more gentle curve is also obtained for the vehicle, thus additionally reducing wear and tear on the flanges.

Instead of the different recesses in the axle direction and in the direction of travel, the rubber member may alternatively be constructed according to FIG. 9. Instead of the recesses of different size in the axle direction and in the direction of travel, the rubber member 11 may be provided with an annular cavity of cross-section in the shape of an ellipse 18. The result of this is that the cavity, as shown in FIG. 9, in section on the line B—B has only a small cross-section and, in section on the line A—A, which lies in the axle direction, has a large cross-section. The suspension is therefore harder in the direction of travel than in the axle direction.

Another alternative construction is shown in FIGS. 10 to 12, wherein the cavity is of annular form, as shown by the annulus 19, so that its expansion in the axle direction and in the direction of travel is identical. The suspension is then so arranged as to be sufficient for the direction of travel and for the axle direction, i.e., in the section on the line A—A, additional cup-shaped cavities 20 are provided. These additional cavities 20 result, for suspension in the axle direction, in an increase of resilience or alternatively softer suspension.

The embodiments illustrated herein are merely given as examples, and many changes may be made within the scope of the invention. The important feature of the invention is that the air cavity between the rubber ring 11 and the housing 12 of the resilient suspension of the axle bearing is used for improving the resilient characteristics of the axle bearing and that different resilient characteristics are obtained in the axle direction and in the direction of travel by suitable formation of the rubber ring.

FIG. 13 shows the various factors which determine the spring characteristic of the suspension. The top of the suspension housing 12 has a conical angle $\alpha$, and the rubber ring member 11 has a circular recess 13 which cooperates with the walls of the housing 12 to form the air gap or cavity. This cavity is of segment-like cross-section and has a radius $r$. The conicity the portion of the housing 12 engaging over the ring 11 is indicated by the angle $\beta$, while the conical part of the mandrel has a conical angle $\gamma$. R indicates the radius of the rounded portion of the mandrel at the bottom, while $\delta$ is the angle which is formed by a line perpendicular to the axis of the mandrel with the tangent on the radius R of the mandrel.

If a suspension of this kind is to be given a certain progressive spring characteristic, the depth of the cavity 13 i.e. the radius of the segment-like cross-section, is established for the lower part of the spring characteristic. For the upper part of the spring characteristic, in which the suspension should become harder, a corresponding angle $\beta$ is determined for the conicity of the suspension housing 12.

The resilient movements are influenced by the magnitude of the angle $\alpha$, of the cone angle $\gamma$ and the angle $\delta$ of the mandrel 9, as well as by the radius R of the enlarged portion of the mandrel.

FIG. 14 shows examples of spring characteristics obtainable by these dimensions. A spring characteristic for a steel leaf spring is indicated in broken lines and is in the form of a straight line, since it is not progressive. A rubber member 21 in which the radius $r$ of the cavity 13 is zero produces the corresponding spring characteristic 21 of FIG. 14, which deviates only comparatively slightly from the characteristic curve of the steel leaf spring. If the radius $r$ of the cavity 13 is calculated according to 22, FIG. 14, a characteristic curve 22 as shown in FIG. 14 is obtained. This, in the lower load range, i.e., for an empty vehicle, is comparatively soft and changes in the upper load range, i.e. as vehicle loading increases, into a hard suspension. The softness of the resilient suspension afforded by the rubber member 23 of FIG. 14 is still more pronounced, since the radius $r$ of the cavity has been further increased. The increase in size of the cavity makes it possible for the spring characteristic curve 23 of FIG. 14 to extend at an even smaller acute angle relative to the abscissa, whereas in the upper load range again, a harder suspension is obtained, similar to that of the other rubber members 21 and 22.

I claim:

1. A resilient suspension for axle bearings and the like, comprising an at least partly hollow housing formed internally with a truncated conical inner wall surface, said conical inner wall surface continuing through a smoothly curved and uninterrupted bend into a base portion of said housing, said base portion having an inner wall surface of greater inclination towards the axis of said housing than said conical inner wall surface, a generally conical mandrel displaceable in said housing axially thereof, said mandrel being formed at its outer end with an annular enlargement constituting a continuation of the generally conical region of said mandrel, and an annular elastic member arranged between said mandrel and the inner wall surfaces of said housing and its base portion, the annular enlargement of said mandrel being adapted to place said elastic member under pressure stress, said elastic member being in the shape of a hollow truncated cone having its inner tapering surface in contact with the outer surface of the mandrel when the axle bearing is unloaded, and its outer tapering surface in contact with the inner wall surface of the housing and, in said unloaded condition of the bearing, extending only as far as the junction of said base portion inner wall surface with said housing inner wall surface, the outer surface of said elastic member cooperating with the inner surface of the housing to define at least one sealed cavity.

2. A resilient suspension as set forth in claim 1, in which the cavity is of part circular cross-section.

3. A resilient suspension as claimed in claim 1, in which said elastic member and the inner surface of said housing define at least one additional sealed cavity of different size.

4. A resilient suspension as claimed in claim 3, in which the two sealed cavities are displaced relative to the axis of truncated cone by substantially 90°.

5. A resilient suspension as set forth in claim 1, wherein substantially horizontal bores are formed in the housing to establish communication between the atmosphere and said cavity.

6. A resilient suspension as set forth in claim 5, further comprising a manually adjustable throttle means in at least one of said bores to enable the air flow therethrough to be regulated.

7. A resilient suspension for axle bearings and the like, comprising an at least partly hollow housing formed internally with a truncated conical inner wall surface, said conical inner wall surface continuing through a smoothly curved and uninterrupted bend into a base portion of said housing, said base portion having an inner wall surface of greater inclination towards the axis of said housing than said conical inner wall surface, a generally conical mandrel displaceable in said housing axially thereof, said mandrel being formed at its outer end with an annular enlargement constituting a continuation of the generally conical region of said mandrel, and an annular elastic member of hollow, truncated conical shape arranged between said mandrel and the inner wall surfaces of said housing and its base portion and adapted to be subjected to pressure stress by the annular enlargement of said mandrel, the inner tapering surface of said elastic member being contiguous with the outer surface of said mandrel and the outer tapering surface of said elastic member being at least partly contiguous with the inner wall surfaces of said housing and its base portion, the outer surface of said elastic member cooperating with the inner wall surface of said housing to define a sealed cavity, and said elastic member being of elliptical cross-section in the general plane of said cavity.

8. A resilient suspension for axle bearings and the like, comprising an at least partly hollow housing formed internally with a truncated conical inner wall surface, said conical inner wall surface continuing through a smoothly curved and uninterrupted bend into a base portion of said housing, said base portion having an inner wall surface of greater inclination towards the axis of said housing than said conical inner wall surface, a generally conical mandrel displaceable in said housing axially thereof, said mandrel being formed at its outer end with an annular enlargement constituting a continuation of the generally conical region of said mandrel, and an annular elastic member of hollow, truncated conical shape arranged between said mandrel and the inner wall surfaces of said housing and its base portion and adapted to be subjected to pressure stress by the annular enlargement of said mandrel, the inner tapering surface of said elastic member being contiguous with the outer surface of said mandrel and the outer tapering surface of said elastic member being at least partly contiguous with the inner wall surfaces of said housing and its base portion, the outer surface of said elastic member cooperating with the inner wall surface of said housing to define a sealed cavity of part circular section, and at least one further, smaller cavity.

9. A resilient suspension for axle bearings and the like, comprising an at least partly hollow housing formed internally with a truncated conical inner wall surface, said conical inner wall surface continuing through a smoothly curved and uninterrupted bend into a base portion of said housing, said base portion having an inner wall surface of greater inclination towards the axis of said housing than said conical inner wall surface, a generally conical mandrel displaceable in said housing axially thereof, said mandrel being formed at its outer end with an annular enlargement constituting a continuation of the generally conical region of said mandrel, and an annular rubber member of hollow, truncated conical form arranged between said mandrel and the inner wall surfaces of the housing and its base portion and adapted to be subjected to pressure stress by the annular enlargement of said mandrel, said rubber member having an annular groove formed in its external surface and having said external surface contiguous with the inner wall surface of said housing as far as the junction of said inner wall surface with the base portion of said housing, the inner surface of said rubber member being engaged over said mandrel, whereby the depth of said cavity together with the conicity of said housing inner wall surfaces achieve a desired gradient of the spring characteristic curve in the upper load range.

References Cited in the file of this patent

UNITED STATES PATENTS

| 1,644,683 | Leipert | Oct. 11, 1927 |
| 2,706,126 | Thiry | Apr. 12, 1955 |
| 2,858,127 | Moulton | Oct. 28, 1958 |

FOREIGN PATENTS

| 937,860 | Germany | Jan. 19, 1956 |